Aug. 31, 1937.   A. J. NEWPORT ET AL   2,091,414
APPARATUS FOR EFFECTING VIBRATION
Filed Aug. 17, 1936   3 Sheets-Sheet 1

A. J. Newport &
G. B. Brader
Inventors

By Glascock Downing Seebold
Attys

Aug. 31, 1937.  A. J. NEWPORT ET AL  2,091,414
APPARATUS FOR EFFECTING VIBRATION
Filed Aug. 17, 1936   3 Sheets-Sheet 2

A. J. Newport
& G. B. Bryder
Inventors
By: Glascock Downing Seebold
Attys.

Aug. 31, 1937.　　A. J. NEWPORT ET AL　　2,091,414
APPARATUS FOR EFFECTING VIBRATION
Filed Aug. 17, 1936　　3 Sheets-Sheet 3

A. J. Newport
& G. B. Brader
Inventors

By Glascock Downing Seebold
Attys.

Patented Aug. 31, 1937

2,091,414

UNITED STATES PATENT OFFICE 2,091,414

APPARATUS FOR EFFECTING VIBRATION

Alfred Joseph Newport, Garston, near Watford, and Gwynne Burnell Brader, London, England; Constance Mary Newport, Quantocks, St. Albans, England, executrix of Alfred Joseph Newport, deceased Application August 17, 1936, Serial No. 96,552
In Great Britain August 26, 1935

5 Claims. (Cl. 259—72)

This invention relates to apparatus for effecting vibration in, for instance, compacting or consolidating material, for instance concrete and like cement masses, sand or like moulding materials employed in forming moulds for use in casting and in the grading of materials by the employment of sieves, screens or the like.

The object of the invention is to provide an improved apparatus for the purposes in question and of the kind in which there is provided means for supporting the object to be vibrated so that it is substantially free to move in a given direction, and to the object there is secured by means of a spring or an equivalent resilient connection a counterweight which is adapted to be set in oscillation or to be vibrated in the same direction under the influence of an appropriate source of vibration as for instance a revolving eccentric mass.

The invention is based upon the observation that the natural frequency of the mode in which the object and the counterweight are caused to vibrate in opposite senses should be made equal or nearly equal to the frequency of the source of vibration so that the alternating force transmitted to the object from the source of vibration is amplified by the resilient connection.

The invention is based upon the further observation that if the mass of the object and any load superimposed upon it is considerably greater than the mass of the counterweight a large change in the weight of the object, which may, for instance, be secured by varying a load superimposed upon it, will cause only a small change in the natural frequency of the system.

The invention is based also upon the observation that if to the object there is also secured a further or additional spring in such manner that it comes into operation when the amplitude of the balance weight on the first-mentioned spring relative to the object exceeds a predetermined amount, the amplitude of the vibration of the object may be varied by varying the duration of the periods during which the second spring is in operation, such effect being, for instance, secured by associating with the first-mentioned spring two stops with a gap between them in which when the machine is at rest the second-mentioned spring or an abutment provided thereon occupies a position midway within the gap.

The invention is based also on the further observation that if an additional spring and a stop or stops or other means are incorporated as mentioned in the previous paragraph, and the amplitude of vibration of the first-mentioned spring is such that the additional spring is operating during a portion of each cycle, the natural frequency of the arrangement rises with increase in frequency of the source of vibration and falls with decrease in frequency of the source, thereby ensuring that small changes in frequency of the source cause only small changes in the force amplification accorded by the resilient connection and in the amplitude of the object being vibrated.

The duration of the periods during which the second spring is in operation may be varied by increasing or decreasing the magnitude of the gap and the natural frequency of the system will be dependent upon the speed of the source of vibration and the magnitude of the gap, the natural frequency being greater when the speed is higher, the gap remaining constant, and greater when the gap is smaller the speed remaining constant.

The invention consists, broadly, in apparatus for effecting vibration, as for instance in compacting or consolidating materials in situ or in moulds and in particular in forming concrete pipes or in effecting the grading of materials comprising a support for the material to be treated, which support may be a table or frame adapted to accommodate moulds or a frame furnished with a sieve or screen to which the material to be sifted is supplied, resting upon or suspended by relatively weak springs or the like which have no appreciable influence on the vibration to which the support is subjected, and to the support there is secured a spring furnished with a counterweight and a further spring with which a stop or stops associated with the counterweight will co-operate in controlling the amplitude of vibration or oscillation of the support.

As a source of vibration any means mechanical or electrical may be employed.

As a source of vibration, for instance, a revolving eccentric mass may be associated with and carried by the counterweight or balance weight.

The invention will be described in greater detail with reference to Figure 1 in which means embodying an apparatus in accordance with the invention is illustrated diagrammatically, and with reference to Figures 2, 3 and 4 in which—

Figure 1:
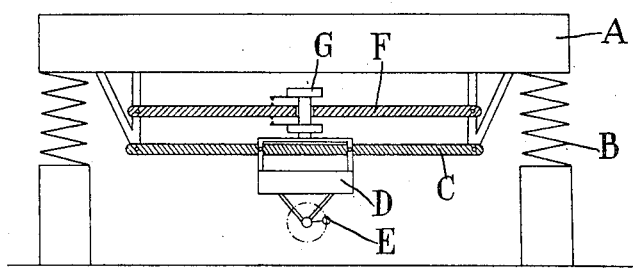

Referring to Figure 1, A is a table, frame or weight supported on soft springs B or otherwise, these springs having no appreciable influence upon the action of the machine. Attached to the table, frame or weight A is a main spring C carrying a counterweight D to which are fixed the bearings of a revolving eccentric mass E or other primary source of vibration. The stiffness of the spring C and the mass of the counterweight D, and table A with its superimposed load are such that the natural frequency of the mode of vibration in which the balance weight D and weight A vibrate in opposite directions or senses, is equal or nearly equal to the frequency of the eccentric E or other source of vibration. The alternating vertical forces transmitted to A from the source E are then amplified by the spring C. The horizontal forces produced by a revolving eccentric are not amplified and the source E may if desired be of such character that it produces alternating vertical forces only. If the mass of the table A with its superimposed load is considerably greater than the mass of the balance weight D a large change in the weight superimposed upon A will cause only a small change in the natural frequency of the system. Attached to the table, frame or weight A is an additional spring F, which may be referred to as the stop spring, which comes into operation when the amplitude of the main spring C relative to the table A exceeds a predetermined amount. It is normally advantageous for the stop spring F to be considerably stiffer than the main spring C and it may, if desired, approximate to a completely rigid member. The stop spring F is brought into operation by the action of fixed or adjustable stops G having equal upper and lower gaps, when the machine is at rest, between the stops and the stop spring. If the frequency of the source E is gradually increased from zero, the amplitude of the weight D relative to the table A, and also the amplitude of A gradually increase until the amplitude of D relative to A and F is equal to the gap at the stops G, the natural frequency of the system up to this point remaining constant. If the frequency of the source E is further increased the spring F commences to operate, and the natural frequency of the system rises with increasing frequency of E owing to the increased stiffness afforded by the spring F and the increasing period of time per cycle during which the spring F is in operation. It is intended that the arrangement should be run at such a speed and gap that the stop spring F is operating, in consequence of which the natural frequency of the system is dependent upon the speed of the source E and the gap at the stops G, the natural frequency increasing with increase of speed and decreasing with increase of gap.

The dependence of the natural frequency upon the gap enables the intensity of vibration of the table, frame or weight A to be varied by varying the gap. It is intended that the arrangement should be run at a constant speed and if the gap is small the stop spring F is in operation for a proportionately long time during each cycle. And the machine is therefore operating well below its natural frequency, in consequence of which the amplification of the alternating force exerted by the source E is small, and the amplitude of movement of the table A is also small. If, on the other hand, the gap is large, then the stop spring F is in operation for a proportionately short time during each cycle, and the natural frequency of the machine is only slightly higher than the frequency of the source E. The amplification of the alternating force exerted by E is therefore large and the amplitude of A also large. It is possible, therefore, to alter the amplitude of A by alteration of the gap, the speed of the source E remaining constant.

The dependence of the natural frequency upon the speed of the source E when the stop spring is operating ensures that the operation of the machine will be stable and that small changes of speed will only cause small changes in the amplitude of the table A. In a system of constant natural frequency running at or near resonance small changes of speed cause large changes of amplitude and the operation of a machine using such a system is critical and tends to be unstable. In the system indicated in Figure 1, however, the natural frequency rises when the speed of the source E rises, or falls when the speed of E falls, so that the ratio of running frequency to natural frequency remains approximately constant. The amplification of the alternating force exerted by the source E does not, therefore, vary rapidly with the speed of E and small changes of speed only cause small changes in the amplitude of A.

In the construction above described two stops are provided and these stops are shown secured to the main spring C. Such stops may be attached to the stop spring F in which case the stop or impact abutment or abutments will be provided on the main spring C.

Figure 4:
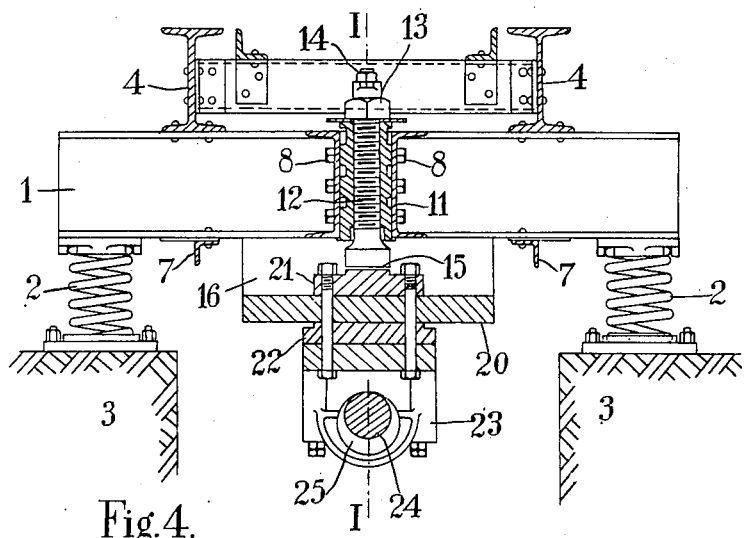
Figure 4 is a view in cross-section on the line III—III of Figure 3 of a practical embodiment of the invention.
Figure 2:
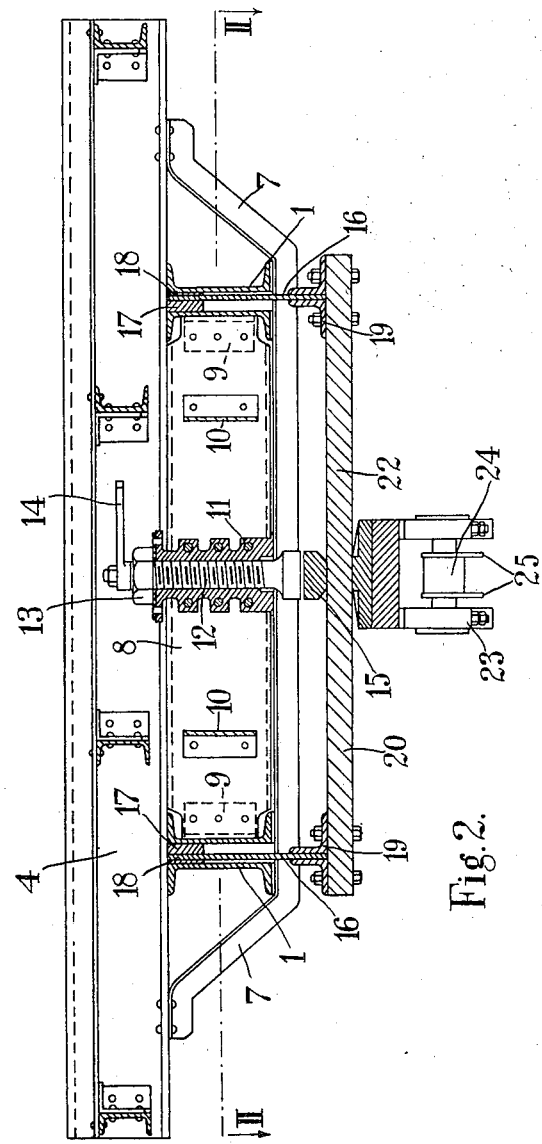
Figure 2 is a view in sectional elevation on the line I—I of Figure 4.
Figure 3:
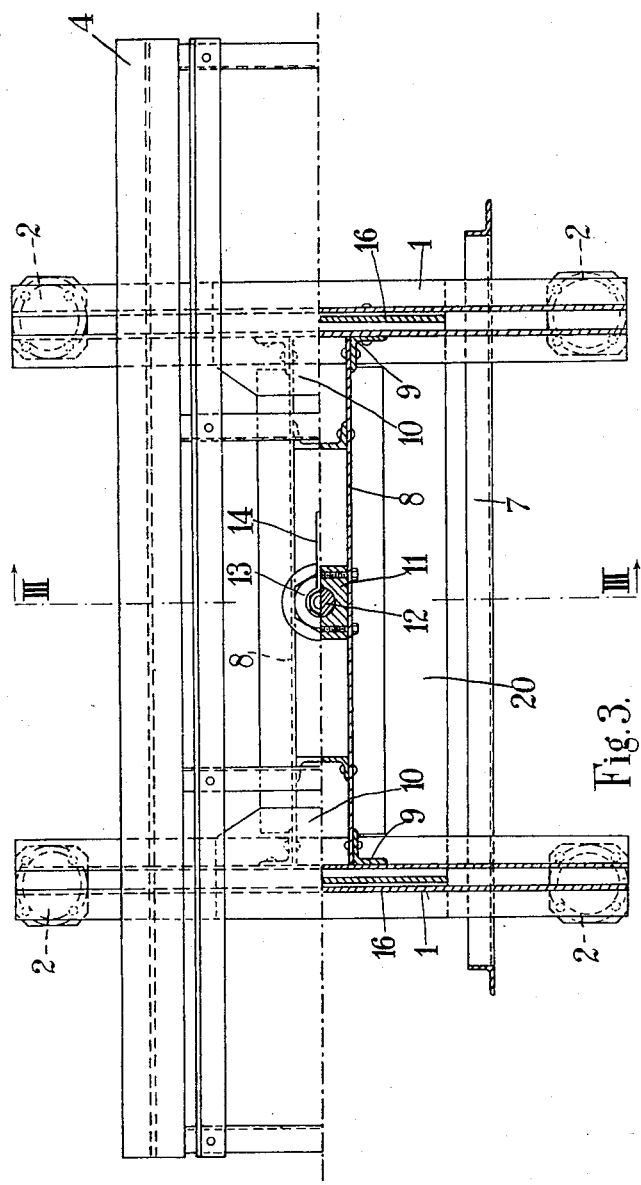
Figure 3 is a view in plan partly in section on the line II—II of Figure 2.

Further, instead of two fixed or adjustable stops a single fixed or adjustable stop and abutment may be employed, the stop being connected with the main spring or the stop spring. In this case the stop spring will only come into operation once per cycle instead of twice per cycle as in the construction previously described in detail. An arrangement in which one stop only is provided is illustrated in Figures 2, 3 and 4 in which 1 are pairs of channel sections supported at their ends through the intermediary of helical springs 2 upon a foundation 3 and connected by longitudinal members 4 to which the object to be treated is secured and from which there extends below the pairs of channel members 1 a stay 7. The longitudinal members 4 and the stay 7 together form the frame or table A, Figure 1.

Between the channel members 1 extend two channels 8 spaced apart and connected to the channel members 1 by angle members 9 and the plates 10. The channel members 8 form the stop spring F of Figure 1. Between the channels 8 is secured an internal screw threaded bush 11 with which is in screw threaded engagement the member 12 which is the equivalent of the stop G in Figure 1, and with the screw threaded member 12 is associated a lever 14 whereby the angular position of the member 12 in the screw threaded block 11 may be varied with the object of altering the gap between the stop 12 and the stop abutment 15. The screw threaded stop 12 may be locked in any angular position by means of the locking nut 13.

Between the channel members 1 are arranged plates 16 with packing pieces 17 and 18 maintaining appropriate clearances between them and the adjacent surfaces of the channel members and these plates are connected by the angle members 19 with the main spring 20 which is the equivalent of the element C of Figure 1.

On the member 20 is secured by clamping plates 21 and 22 a frame 23 in which is mounted a pulley 24 having eccentric flanges 25, these flanges forming eccentric E of Figure 1.

The clamps 21 and 22, the frame 23, the pulley 24, the flanges 25 and a portion of the main spring 20 together form the counterweight D of Figure 1.

What we claim is:—

1. Apparatus for effecting vibration of a mass as in compacting, consolidating and grading materials, comprising a table for the mass to be treated, relatively weak springs which have no appreciable influence on the vibration to which the table is subjected floatingly retaining said table, a main spring furnished with a counterweight secured to the table, a source of vibration associated with the counterweight and a secondary spring secured to the table and co-operating with the main spring for controlling the amplitude of vibration of the table and for securing stability of operation.

2. Apparatus for effecting vibration of a mass as in compacting, consolidating and grading materials, comprising a table for the mass to be treated, relatively weak springs which have no appreciable influence on the vibration to which the table is subjected floatingly retaining said table, a main spring furnished with a counterweight secured to the table, a source of vibration associated with the counterweight, a secondary spring secured to the table and means on the main spring and on the secondary spring adapted to coact in controlling the amplitude of vibration of the table and for securing stability of operation.

3. Apparatus for effecting vibration of a mass as in compacting, consolidating and grading materials, comprising a table for the mass to be treated, relatively weak springs which have no appreciable influence on the vibration to which the table is subjected floatingly retaining said table, a main spring furnished with a counterweight secured to the table, a source of vibration associated with the counterweight, a secondary spring secured to the table and stops on the main and secondary springs adapted to be brought into contact in the vibration of the main spring for securing the co-operation of the main and secondary springs in controlling the amplitude of vibration of the table.

4. Apparatus for effecting vibration of a mass as in compacting, consolidating and grading materials, comprising a table for the mass to be treated, relatively weak springs which have no appreciable influence on the vibration to which the table is subjected floatingly supporting said table, a main spring furnished with a counterweight secured to the table, a source of vibration associated with the counterweight, a secondary spring secured to the table, means comprising two stops with an intervening gap on the main spring and a stop associated with the secondary spring and positioned within said gap and securing the co-operation of the secondary spring with the main spring in controlling the amplitude of vibration of the table.

5. Apparatus for effecting vibration of a mass as in compacting, consolidating and grading materials, comprising a table for the mass to be treated, relatively weak springs which have no appreciable influence on the vibration to which the table is subjected floatingly supporting said table, a main spring furnished with a counterweight secured to the table, a source of vibration associated with the counterweight, a secondary spring secured to the table, means comprising two adjustable stops with an intervening gap on the main spring and a stop associated with the secondary spring and positioned within said gap and securing the co-operation of the secondary spring with the main spring in controlling the amplitude of vibration of the table.

ALFRED JOSEPH NEWPORT.
GWYNNE BURNELL BRADER.